(12) United States Patent
Wamprecht et al.

(10) Patent No.: US 6,380,308 B1
(45) Date of Patent: Apr. 30, 2002

(54) HIGH-SOLIDS BINDER COMPOSITIONS AND THEIR USE

(75) Inventors: Christian Wamprecht, Neuss; Michael Sonntag, Odenthal; Holger Mundstock, Wermelskirchen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/711,743

(22) Filed: Nov. 13, 2000

(30) Foreign Application Priority Data

Nov. 17, 1999 (DE) .......................... 199 55 129

(51) Int. Cl.$^7$ .............................................. C08G 18/63
(52) U.S. Cl. ......................... 525/124; 525/64; 525/68; 525/75; 525/84; 428/423.1; 427/385.3; 528/73
(58) Field of Search .............................. 525/68, 64, 75, 525/84, 123, 124; 428/423.1; 427/385.3; 528/73

(56) References Cited

U.S. PATENT DOCUMENTS

| 4,837,273 A | 6/1989 | Wamprecht et al. .......... 525/66 |
| 5,596,057 A | 1/1997 | Epple et al. ................ 526/273 |
| 5,608,012 A | 3/1997 | Epple et al. ................ 525/374 |
| 5,733,973 A | * 3/1998 | Wamprecht et al. |

FOREIGN PATENT DOCUMENTS

| CA | 2128551 | 1/1995 |
| EP | 0171847 | 6/1988 |
| EP | 0225809 | 12/1991 |

* cited by examiner

*Primary Examiner*—Rachel Gorr
(74) *Attorney, Agent, or Firm*—Joseph C. Gil; Thomas W. Roy

(57) ABSTRACT

The invention relates to a binder composition containing
A) 50–90 parts by wt. of OH-functional graft copolymer resins prepared from
  a) 0.1 to 10 parts by wt. of polybutadiene,
  b) 5 to 60 parts by wt. of an unsaturated aromatic monomer,
  c) 10 to 50 parts by wt. of a hydroxyalkyl ester of (meth)acrylic acid,
  d) 5 to 70 parts by wt. of a cycloaliphatic ester of (meth)acrylic acid,
  e) 5 to 50 parts by wt. of an aliphatic ester of (meth) acrylic acid,
  f) 0.1 to 5 parts by wt. of a mono-olifinically unsaturated mono- or dicarboxylic acid and/or maleic or fumaric acid half esters,
B) 0.1 to 5 parts by wt. of a polyfunctional crosslinking agent.

16 Claims, No Drawings

HIGH-SOLIDS BINDER COMPOSITIONS AND THEIR USE

BACKGROUND OF THE INVENTION

1. Field of the Invention

The present invention relates to new binder compositions of polyacrylate polyols and crosslinking agents, a process for their preparation and their use for the production of coatings.

2. Description of the Prior Art

The advantage of high-solids polyacrylate resins is to be seen in the reduction in the emission of organic compounds, preferably solvents, during the application of the coating. To obtain these high-solids coating formulations, corresponding polyacrylate resins with low viscosities, i.e. low molecular weights, should be used.

It is known that free-radical solvent polymerization can be used for the preparation of low-viscosity polymers (e.g. EP-A 408 858, EP-A 398 387 and U.S. Pat. No. 4,145,513). The properties of these polymers are impaired by the use of considerable amounts of polymerization regulators and secondary products thereof. In particular, the thiols employed as polymerization regulators may smell nauseous or may even be toxic. In EP-A 225 808, EP-A 225 809 and EP-A 778 298, α-olefins, such as e.g. 1-octene or 1-decene, which have no unpleasant smell, are therefore used as regulators. However, two-component polyurethane (2C PU) lacquers based on the polyacrylate resins according to EP-A 225 809 and aliphatic polyisocyanates have too slow a physical drying to be employed e.g. for use in car repair and large vehicle lacquering. The drying of 2C PU lacquers according to EP-A 778 298 also no longer completely meets current application requirements in this respect and is therefore in need of improvement.

EP-A 635 523 and EP-A 638 591 describe high-solids polyacrylate resins which are prepared by bulk polymerization and are then diluted with a suitable solvent.

EP-A 635 523 describes the effect, known from solvent polymerization, of the preparation of high-solids polyacrylate resins with a unimodal narrow distribution using peroxides containing tert-amyl groups, but applied to bulk polymerization. As expected, it was demonstrated that lower-viscosity polyacrylate resins are obtained with peroxides containing tert-amyl groups than with peroxides containing tert-butyl groups. However, bulk polymerization has disadvantages compared with solvent polymerization, in particular with respect to the removal of the heat of reaction. The polyacrylate resins prepared in the examples of the above mentioned application have viscosities at 23° C. of between 2,790 and 9,130 mPa.s at a solids content of 70 wt. %, and are therefore in the medium-solids than in the high-solids range. They do not meet the current requirements of high-solids lacquers.

EP-A 171 847 and EP-A 638 591 describe high-solids copolymers which have a relatively low viscosity at a high solids content due to the use of (meth)acrylate monomers with sterically bulky (cyclo)alkyl radicals. However, the resistance of such copolymers to solvents and chemicals no longer completely meets the current requirements of highly resistant car repair lacquers. In the preparation of the copolymers according to EP-A 638 591 by bulk polymerization, a monoepoxide (Cardura E 10) is initially introduced into the reaction vessel as the reaction medium in all the examples described. During the polymerization this monoepoxide reacts with the (meth)acrylic acid metered in and is thus incorporated into the polyacrylate. Predominantly secondarily bonded hydroxyl groups are formed by this reaction, and, in addition to the primary hydroxyl groups or secondary hydroxyl groups introduced by hydroxy-functional monomers (hydroxyethyl methacrylate and hydroxypropyl methacrylate respectively), are available for the reaction with the polyisocyanate used as a crosslinking agent.

However, secondary hydroxyl groups have a significantly lower reactivity towards polyisocyanates than primary hydroxyl groups. 2C PU lacquers which are cured at low temperatures (car repair and large vehicle lacquering, wood lacquering) and are based on polyacrylate resins with predominantly secondarily bonded hydroxyl groups therefore achieve an adequate crosslinking density and a satisfactory resistance to solvents only after several days. Precisely in car repair and large vehicle lacquering, however, a rapid chemical crosslinking is also urgently necessary, in addition to a rapid physical drying, in order thus to allow the vehicle to be further used as quickly as possible.

It is therefore the object of the invention to provide new binder compositions based on hydroxy-functional copolymers and (cyclo)aliphatic lacquer polyisocyanates which give high-solids lacquers which, in addition to a rapid physical drying, also show a rapid chemical crosslinking at room temperature (23° C.) and an excellent resistance to solvents after a short curing time of 1 to 2 days.

New high-solids binder compositions, which can be cured to give high-quality coatings are obtained by combination of the OH-functional binder components essential to the invention with polyisocyanates. In addition to outstanding optical properties of the films and a high resistance to solvents and chemicals, these coatings show a very rapid physical drying and chemical crosslinking at room temperature and a good surface hardness.

The very good overall profile of properties of the resulting coating films, such as hardness, elasticity and resistance to chemicals, solvents and weathering, allows use in vehicle lacquering, preferably in car repair and large vehicle lacquering. Other fields of use lie in the sectors of general industrial lacquering, corrosion protection and wood and furniture lacquering, it also being possible for other crosslinking resins to be used as the polyisocyanates.

SUMMARY OF THE INVENTION

The invention relates to a binder composition containing

A) 50 to 90 parts by wt., preferably 90 to 60 parts by wt. of OH-functional graft copolymer resins prepared by copolymerization of
  a) 0.1 to 10 parts by wt. of at least one optionally functional polybutadiene with a number-average molecular weight of 500 to 10,000 and a structure which is at least 20% 1,2-vinyl,
  b) 5 to 60 parts by wt. of at least one unsaturated aromatic monomer,
  c) 10 to 50 parts by wt. of at least one hydroxyalkyl ester of acrylic and/or methacrylic acid having 2 to 4 C atoms in the hydroxyalkyl radical and a primary hydroxyl group,
  d) 5 to 70 parts by wt. of at least one cycloaliphatic ester of acrylic and/or methacrylic acid having 1 to 12 C atoms in the alcohol component,
  e) 5 to 50 parts by wt. of at least one aliphatic ester of acrylic and/or methacrylic acid having 1 to 8 C atoms in the alcohol component,
  f) 0.1 to 5 parts by wt. of at least one α,β-monoolefinically unsaturated mono- or dicarboxylic acid having 3 to 7 C atoms and/or at least one maleic acid or fumaric acid half-ester having 1 to 14 C atoms in the alcohol radical and
  g) 0 to 40 parts by wt. of further copolymerizable olefinically unsaturated compounds and B) 10 to 50 parts by wt. of a polyfunctional crosslinking agent or crosslinking agent mixture, the sum of the parts by wt. of components A) and B), based on the weight of A) and B), and the sum of the parts by wt. of components a) to g) in each case being 100.

The invention also relates to a process for the preparation of the binder compositions according to the invention characterized in that the graft copolymers A) described above are prepared by free-radical polymerization in organic solvents at temperatures between 150 and 240° C. and are combined with suitable crosslinking resins B).

The invention also provides the use of the binder compositions according to the invention to produce lacquers for vehicle lacquering, in particular for car repair and large vehicle lacquering, for general industrial, wood and furniture lacquering and in the corrosion protection sector.

DETAILED DESCRIPTION OF THE INVENTION

A large number of polyfunctional crosslinking agents are suitable according to the invention, including aminoplast resins, such as alkoxylate melamine resins, melamine-formaldehyde condensation products, urea resins, guanidine resins, phenoplast resins, resol resins and, preferably, optionally blocked polyisocyanate resins, preferably oligomeric isocyanates with a biuret, allophanate, uretdione, urethane and/or isocyanurate or iminooxadiazinedione structure.

The graft copolymers A) differ quite substantially in their chemical composition both from the polyacrylate polyols of EP-A 225 809 and EP-A 778 298 and from the bulk copolymers of EP-A 635 523 and EP-A 638 591. In respect of the lacquering properties, in particular the rate of drying and the resistance to solvents, advantages result over the products of the documents mentioned, as is demonstrated in corresponding comparison examples.

Similar but not identical binder compositions are described in EP 279 311. Furthermore, the binder compositions according to the invention are intended in particular for a field of use which is not referred to in the earlier document mentioned, because the lacquers described therein have too long a drying time and give highly flexible coating films with too low a hardness.

The graft copolymer resins A) essential to the invention can be prepared by copolymerization of constituents a) to g) by conventional processes. Free-radical polymerization in solution is preferred. In this process, monomeric and oligomeric units are copolymerized at temperatures of 140 to 240° C. in the presence of reagents which form free radicals.

The polyacrylate resins A) include the following components:

Component a) includes one or more optionally functional polybutadienes with a number-average molecular weight of 500 to 5,000, preferably 500 to 3,000, more preferably 500 to 2,000. The polybutadienes have a structure which is at least 20% 1,2-vinyl, preferably at least 30% 1,2 vinyl and more preferably at least 40% 1,2-vinyl and most preferably 45% 1,2-vinyl.

Component b) includes an unsaturated aromatic monomer, which is preferably styrene. It is used in amounts of 5 to 60 parts by wt., preferably 10 to 40, more preferably 15 to 35, and most preferably 15 to 25 parts by wt.

Component c) includes a hydroxyalkyl ester of acrylic and/or methacrylic acid having 2 to 4 C atoms in the hydroxyalkyl radical and a primary hydroxyl group is used. Preferably component c) is hydroxyethyl acrylate, hydroxyethyl methacrylate, butane-1,4-diol monoacrylate or mixtures thereof. More preferably it is hydroxyethyl acrylate, hydroxyethyl methacrylate, or mixtures thereof. It is used in amounts of 10 to 50, preferably 10 to 45, more preferably 20 to 40, most preferably 25 to 35 parts by wt.

Component d) includes a cycloaliphatic ester of acrylic and/or methacrylic acid having 1 to 12 C atoms in the alcohol component, preferably isobornyl acrylate, isobornyl methacrylate, cyclohexyl (meth)acrylate, 3,5,5-trimethylcyclohexyl (meth)acrylate, 4-tert-butylcyclohexyl (meth)acrylate or mixtures thereof, more preferably isobornyl acrylate. It is used in amounts of 5 to 70, preferably 10 to 50, more preferably 15 to 45, most preferably 20 to 30 parts by weight.

Component e) includes at least one aliphatic ester of acrylic and/or methacrylic acid having 1 to 8 C atoms preferably, 1 to 4 C atoms in the alcohol component. It is used in amounts of 5 to 50 parts by wt, preferably 10 to 40 parts by wt., and more preferably 15 to 25 parts by wt.

Component f) includes at least one α,β-mono-olefinically unsaturated mono- or dicarboxylic acid having 3 to 7 C atoms and/or at least one maleic acid or fumaric acid half-ester having 1 to 14 C atoms in the alcohol radical, preferably acrylic acid, methacrylic acid, or a maleic or fumaric acid half-ester having 1 to 8 C atoms in the alcohol component or mixtures thereof, and more preferably acrylic acid, methacrylic acid or mixtures thereof. It is used in amounts of 0.1 to 5 parts by wt., preferably 0.3 to 4 parts by wt., more preferably 0.5 to 3 parts by wt. and most preferably 0.5 to 2 parts by wt.

Component g) is an optional component and can include other copolymerizable olefinically unsaturated compounds, preferably acrylonitrile, methacrylonitrile, hydroxypropyl (meth)acrylate (only up to 10 parts by wt.), vinyl esters of aliphatic optionally branched monocarboxylic acids having 1 to 10 C atoms in the acid radical, di(cyclo)alkyl esters of maleic and/or fumaric acid having 1 to 8 C atoms in the alcohol radical or mixtures thereof. More preferably hydroxypropyl (meth)acrylate (only up to 10 parts by wt.), vinyl esters of aliphatic optionally branched monocarboxylic acids having 1 to 10 C atoms in the acid radical, di(cyclo) alkyl esters of maleic and/or fumaric acid having 1 to 8 C atoms in the alcohol radical or mixtures thereof, and most preferably, hydroxypropyl (meth)acrylate (only up to 5 parts by wt.), vinyl esters of aliphatic optionally branched monocarboxylic acids having 1 to 9 C atoms in the acid radical, di(cyclo)alkyl esters of maleic and/or fumaric acid having 1 to 6 C atoms in the alcohol radical or mixtures thereof, are used.

Component g) is used in amounts of 0 to 40 part by weight, preferably 0 to 25, more preferably 0 to 20, and most preferably 0 to 10 parts by weight.

The polyacrylate resins A) preferably include:
a) 0.2 to 8 parts by wt. of one or more optionally functional polybutadienes with a number-average molecular weight of 500 to 5,000 and a structure which is at least 30% 1,2-vinyl,
b) 10 to 40 parts by wt. styrene,
c) 15 to 45 parts by wt. hydroxyethyl acrylate, hydroxyethyl methacrylate, butane-1,4-diol monoacrylate or mixtures thereof,
d) 10 to 50 parts by wt. of at least one cycloaliphatic ester of acrylic and/or methacrylic acid having 1 to 12 C atoms in the alcohol component, e) 10 to 40 parts by wt. of at least one aliphatic ester of acrylic and/or methacrylic acid having 1 to 8 C atoms in the alcohol component, f) 0.3 to 4 parts by wt. acrylic acid, methacrylic acid, or a maleic or fumaric acid half-ester having 1 to 8 C atoms in the alcohol component or mixtures thereof and g) 0 to 25 parts by wt. acrylonitrile, methacrylonitrile, hydroxypropyl (meth)-acrylate (only up to 10 parts by wt.), vinyl esters of aliphatic optionally branched monocarboxylic acids having 1 to 10 C atoms in the acid radical, di(cyclo)alkyl esters of maleic and/or fumaric acid having 1 to 8 C atoms in the alcohol radical or mixtures thereof, the sum of the parts by wt. of components a) to g) being 100. The polyacrylate resins A) more preferably include:

a) 0.3 to 7.5 parts by wt. of one or more optionally functional polybutadienes with a molecular weight of 500 to 3,000 and a structure which is at least 40% 1,2-vinyl, b) 15 to 35 parts by wt. styrene, c) 20 to 40 parts by wt. hydroxyethyl acrylate, hydroxyethyl methacrylate or mixtures thereof d) 15 to 45 parts by wt. sobornyl acrylate, Isobornyl methacrylate, cyclohexyl (meth)acrylate, 3,5,5-trimethylcyclohexyl (meth)acrylate, 4-tert-butylcyclohexyl (meth)acrylate or mixtures thereof, e) 10 to 40 parts by wt. of at least one aliphatic ester of acrylic and/or methacrylic acid having 1 to 8 C atoms in the alcohol component, f) 0.5 to 3 parts by wt. acrylic acid, methacrylic acid or mixtures thereof and g) 0 to 20 parts by wt. hydroxypropyl (meth)acrylate (only up to 10 parts by wt.), vinyl esters of aliphatic optionally branched monocarboxylic acids having 1 to 10 C atoms in the acid radical, di(cyclo)alkyl esters of maleic and/or fumaric acid having 1 to 8 C atoms in the alcohol radical or mixtures thereof, the sum of the parts by wt. of components a) to g) being 100. The polyacrylate resins A) most preferably include:

a) 0.4 to 6 parts by wt. of one or more optionally functional polybutadienes with a molecular weight of 500 to 2,000 and a structure which is at least 45% 1,2-vinyl, b) 15 to 25 parts by wt. styrene, c) 25 to 35 parts by wt. hydroxyethyl acrylate, hydroxyethyl methacrylate or mixtures thereof, d) 20 to 30 parts by wt. sobornyl acrylate, e) 15 to 25 parts by wt. of at least one aliphatic ester of acrylic and/or methacrylic acid having 1 to 4 C atoms in the alcohol component, f) 0.5 to 2 parts by wt. acrylic acid, methacrylic acid or mixtures thereof, and g) 0 to 10 parts by wt. hydroxypropyl (meth)acrylate (up to 5 parts by wt.), vinyl esters of aliphatic optionally branched monocarboxylic acids having 1 to 9 C atoms in the acid radical, di(cyclo)alkyl esters of maleic and/or fumaric acid having 1 to 6 C atoms in the alcohol radical or mixtures thereof, the sum of the parts by wt. of components a) to g) being 100.

Suitable starting materials a) for the graft copolymers A) are the polybutadienes which have at least 20% of lateral 1,2-vinyl double bonds.

Polybutadienes with a content of vinylic double bonds of ≧30% are preferably suitable. The remainder of double bonds in this case can comprise any desired ratio of 1,4-cis and 1,4-trans structure. Polybutadienes which additionally also have double bonds in cyclic structures are also suitable as component a). An especially preferred starting material is a product with ≧45% of 1,2-vinyl double bonds.

Isomer mixtures of polybutadienes will in general be employed, e.g. polybutadienes which contain 30 to 90% of 1,2-vinylic double bonds, 10 to 70% of mixtures of 1,4-cis and 1,4-trans double bonds and 0 to 30% of cyclic contents. The polybutadienes can furthermore optionally carry functional groups, e.g. hydroxyl groups, carboxyl groups etc.

Such polybutadienes of different configuration are known, e.g. "Makromolekule [Macromolecules]" by H. G. Elias, 4th edition, Hüthig und Wepf-Verlag, Basle, Heidelberg, New York, pages 676 and 744 to 746 and 1012 et seq.

The monomers and oligomers a) to g) are in general incorporated into the graft copolymer in the same ratios as they are employed for the polymerization. The units incorporated are substantially randomly distributed.

Suitable solvents in the preparation of component A) include aliphatic, cycloaliphatic and/or aromatic hydrocarbons, such as alkylbenzenes, e.g. toluene and xylene; esters, such as ethyl acetate, n-propyl acetate, isopropyl acetate, n-butyl acetate, acetates with longer alcohol radicals, butyl propionate, pentyl propionate, ethylene glycol monoethyl ether acetate and the corresponding methyl ether acetate; ethers, such as ethylene glycol acetate monomethyl, -ethyl or -butyl ether; ketones, such as methyl ethyl ketone, methyl isobutyl ketone and methyl n-amyl ketone, and lactones; and mixtures of such solvents.

Graft copolymers A) can be prepared continuously or discontinuously. In the continuous preparation, the monomer mixture and the initiator are metered uniformly and continuously into a polymerization reactor and the corresponding amount of polymer is removed continuously at the same time. Copolymers which chemically are virtually uniform can preferably be prepared in this way or can also be synthesized by a discontinuous preparation in which the monomer mixture and the initiator are metered into the polymerization reactor at a constant rate without removing the polymer.

The grafting copolymerization is generally carried out in the temperature range from 140 to 240° C., preferably 160 to 210° C., and more preferably 165 to 200° C., under a pressure of up to 25 bar. The initiators are employed in amounts of 0.05 to 15 wt. %, preferably 1 to 10 wt. %, and more preferred 2 to 8 wt. %, based on the total amount of components a) to g).

Suitable initiators for the preparation of graft copolymers A) are known azo- or peroxide-based free-radical initiators, but only those which have a half-life of approx. 5 seconds to approx. 30 minutes sufficiently long for the polymerization in the above mentioned temperature range. Examples of suitable initiators include 2,2'-azobis-(2-methylpropanenitrile), 2,2'-azobis-(2-methylbutanenitrile), 1,1'-azobis(cyclohexane-carbonitrile), tert-butyl peroxy-2-ethylhexanoate, tert-butyl peroxydiethyl-acetate, tert-butyl peroxyisobutyrate, 1,1-di-tert-butylperoxy-3,3,5-trimethylcyclohexane, 1,1-di-tert-butylperoxycyclohexane, tert-butyl peroxy-3,5-5-trimethylhexanoate, tert-butyl peroxyisopropyl carbonate, tert-butyl peroxyacetate, tert-butyl peroxybenzoate, dicumyl peroxide, tert-butyl cumyl peroxide, di-tert-butyl peroxide and di-tert-amyl peroxide.

Graft copolymers A) are valuable binder components for two-component coating compositions. In this connection, "two-component coating compositions" are to be understood as both "one-pot systems" and "two-pot systems".

Since the polymer resins according to the invention are binder components for two-component lacquers, the lacquers contain a hardener component in addition to the polymer resins according to the invention (and optionally further polyhydroxy compounds and/or aminic reactive thinners). If this hardener is, for example, a polyisocyanate with free isocyanate groups, the ready-to-use coating compositions can be prepared by mixing the components just shortly before their processing. In such a case this would be a "two-pot system".

However, if the hardener is a compound which reacts with the polymer resins according to the invention only at elevated temperature, for example polyisocyanates with blocked isocyanate groups, the hardener can also already be combined with the polymer resin at room temperature to give a "one-pot system" which can be stored at room temperature.

In one use according to the invention graft copolymers A) are employed as a mixture with other organic polyhydroxy compounds known from polyurethane coating technology as the polyhydroxy component and/or as a mixture with aminic reactive thinners. These other polyhydroxy compounds can be the known polyester, polyether, polycarbonate, polyurethane or polyacrylate polyols. If such compounds are employed in addition to graft copolymers A) the polyacrylate polyols and/or polyester polyols of the prior art are preferred. In the case of the aminic reactive thinners, these can be products with blocked amino groups, such as aldimines, ketimines, or oxazolanes, or those which contain amino groups which are still free but are weakened in their reactivity, such as aspartic acid esters. As a general rule, the aminic reactive thinners contain more than one (blocked) amino group, so that they contribute towards building up the polymeric coating film network during the crosslinking reaction.

In the use according to the invention graft copolymers A) can be employed as a mixture with up to 70, preferably up to 50 wt. % of other polyols and/or aminic reactive thinners of the type mentioned by way of example. However, the graft copolymers essential to the invention are preferably employed as the sole polyol component in the use according to the invention.

The hydroxyl group content of graft copolymers A) is 1.07 to 8.51 wt. %, preferably 1.77 to 7.77 wt. %, more preferably 2.62 to 7.04 wt. %, and most preferably 3.27 to 6.31 wt. %.

Suitable reaction components B) binder compositions are crosslinking reagents which react with the hydroxyl groups of the graft copolymer resins, including blocked or non-blocked polyisocyanates; aminoplast resins, e.g. corresponding melamine derivatives, such as alkoxylated melamine resins, or melamine-formaldehyde condensation products (e.g. FR-A 943 411, from D. H. Salomon in "The Chemistry of Organic Filmformers", pages 235–240, John Wiley & Sons, Inc., New York, 1974); and other known crosslinking agents, which are reactive with alcoholic hydroxyl groups, e.g. epoxides, carboxylic acid anhydrides, phenoplast resins, resol resins, urea resins or guanidine resins and mixtures thereof.

Preferred reaction components B) binder compositions are commercially available, optionally blocked lacquer polyisocyanates, i.e. the known modification products containing urethane groups, uretdione groups, allophanate groups and, in particular, biuret groups, isocyanurate groups and iminooxadiazinedione groups, and prepared from monomeric diisocyanates, such as 1,6-diisocyanatohexane, 1-isocyanato-3,3,5-trimethyl-5-isocyanatomethyl-cyclohexane(isophorone-diisocyanate), 4,4'-diisocyanatodicyclohexylmethane, 1,4-diisocyanatocyclohexane, 1-methyl-2,4-diisocyanatocyclohexane and its mixtures with up to 35 wt. %, based on the total mixture, of 1-methyl-2,6-diisocyanatocyclohexane, 2,4-diisocyanatotoluene and its mixtures with up to 35 wt. %, based on the total mixture, of 2,6-diisocyanatotoluene or mixtures thereof. The corresponding "lacquer polyisocyanates" with aliphatically and/or cycloaliphatically bonded free isocyanate groups are especially preferred. A suitable polyisocyanate which does not contain the above mentioned groupings is 4-isocyanatomethyl-1,8-octane-diisocyanate. Suitable blocking agents for the blocked polyisocyanates optionally employed include ε-caprolactam, butanone oxime, triazole, phenol and phenol derivatives, secondary amines and malonic acid alkyl esters.

The lacquer polyisocyanates containing urethane groups include the reaction products of 2,4- and/or 2,6-diisocyanatotoluene or 1-methyl-2,4- and/or 1-methyl-2,6-diisocyanatocyclohexane with less than stoichiometric amounts of trimethylol-propane, or mixtures thereof with simple diols, such as the isomeric propane- or butanediols. The preparation of such coating polyisocyanates containing urethane groups in a practically monomer-free form is described, for example, in DE-A 1 090 196.

The lacquer polyisocyanates containing biuret groups include, in particular, those based on 1,6-diisocyanatohexane, the preparation of which is described, for example, in EP-A 0 003 505, DE-A 1 101 394, U.S. Pat. No. 3,358,010 or U.S. Pat. No. 3,903,127.

The preferred lacquer polyisocyanates containing isocyanurate groups include, in particular, the trimers and co-trimers of the diisocyanates mentioned above, such as the polyisocyanates containing isocyanurate groups which are based on diisocyanatotoluene according to GB-A 1 060 430, GB-A 1 506 373 or GB-A 1 485 564, the co-trimers of diisocyanatotoluene with 1,6-diisocyanatohexane, which may be prepared, for example, in accordance with DE-A 1 644 809 or DE-A 3 144 672, and, in particular, the aliphatic, the aliphatic-cycloaliphatic and the cycloaliphatic trimers or co-trimers based on 1,6-diisocyanatohexane and/or isophorone-diisocyanate, which are obtainable, for example, in accordance with U.S. Pat. Nos. 4,324,879, 4,288,586, DE-A 3 100 262, DE-A 3 100 263, DE-A 3 033 860 or DE-A 3 144 672. The lacquer polyisocyanates employed in the use according to the invention in general have an isocyanate content of 5 to 25 wt. %, an average NCO functionality of 2.0 to 5.0, preferably 2.8 to 4.0, and a residual content of monomeric diisocyanates used for their preparation of less than 2 wt. %, preferably less than 0.5 wt. %. Any desired mixtures of the lacquer polyisocyanates mentioned can of course also be employed.

In the high-solids two-component polyurethane coating compositions the polyol component and the polyisocyanate component are present in amounts corresponding to an equivalent ratio of isocyanate groups to hydroxyl groups of 5:1 to 1:2, preferably 3:1 to 1:1.5, and more preferably 1.5:1 to 1:1.2. The two-component coating compositions obtained by mixing the two components have only a limited processing time of approx. 1 to 24 hours and are processed either as such (solvent-free clear lacquers), or preferably using the known additives. These additives can be added either to the mixture or to the individual components before mixing thereof.

Suitable additives include solvents, such as ethyl acetate, n-propyl acetate, iso-propyl acetate, n-butyl acetate, n-hexyl acetate, n-heptyl acetate, 2-ethylhexyl acetate, methoxypropyl acetate, methyl ethyl ketone, methyl isobutyl ketone, toluene, xylene, mixtures of higher aromatics, white spirit or any desired mixtures of these solvents.

Further additives include plasticizers, such as tricresyl phosphate, phthalic acid diesters and chloroparaffins; pigments and fillers, such as titanium dioxide, barium sulfate, chalk and carbon black; catalysts, such as N,N-dimethylbenzylamine, N-methylmorpholine, zinc octoate, tin(II) octoate or dibutyltin dilaurate; flow agents; thickeners; stabilizers, such as substituted phenols; organofunctional silanes as adhesion promoters; light stabilizers; and UV absorbers. Such light stabilizers include sterically hindered amines, such as are described in DE-A 2 417 353 (U.S. Pat. Nos. 4,123,418 and 4,110,304) and DE-A 2 456 864 (U.S. Pat. Nos. 3,993,655 and 4,221,701). More preferred compounds include: bis-(1,2,2,6,6-pentamethylpiperid-4-yl) sebacate, bis-(2,2,6,6-tetramethylpiperid-4-yl) sebacate and n-butyl-(3,5-di-tert-butyl-4-hydroxybenzyl)-malonic acid bis-(1,2,2,6,6-pentamethylpiperid-4-yl) ester.

The moisture adhering to the fillers and pigments can be removed by drying beforehand or by using water-absorbing substances, such as e.g. molecular sieve zeolites.

Drying of the films can take place at room temperature if polyisocyanates which are free from blocking agents are used as the crosslinking agent, and requires no essential increase in temperature in order to achieve the above mentioned optimum properties. If the binders are used as a repair lacquer, however, an increase in temperature to approx. 60 to 100° C., preferably 60 to 80° C., for a period of 20 to 60 minutes is often advisable in order to shorten the drying and curing time. If blocked polyisocyanates or the other above mentioned product groups are used as the crosslinking agent, higher temperatures of, for example, 100 to 240° C., preferably 110 to 220° C. and more preferably 120 to 180° C., must be used for the drying and curing of the films.

The coating compositions according to the invention are distinguished by a high solids and a low solvent content. The coating films resulting after curing have a high hardness, a good elasticity, an excellent resistance to weathering and chemicals and a high gloss. The curing times both for physical superficial drying and for chemical crosslinking are short, so that coated articles for use very rapidly are resistant to weathering, solvents and chemicals and can be used.

The coating compositions employed according to the invention are therefore suitable above all for coating large vehicles, such as aircraft, railway and tram carriages, lorry superstructures and the like. Another preferred field of use is their use as a car repair coating. The coating compositions are furthermore suitable for corrosion protection applications, such as e.g. coating of bridges and power masts, for general industrial, wood and furniture coating and for the first coating of cars.

The coating compositions according to the invention are applied by conventional methods, for example by spraying, pouring, dipping, brushing, atomizing or rolling. The coating compositions according to the invention are suitable both for the production of primer coats and for the production of intermediate coats, and in particular for the production of top coats on the substrate to be coated.

EXAMPLES

The following examples serve to further illustrate the invention. All the percentage data relate to the weight, unless noted otherwise.

Example 1

General preparation instructions for the graft copolymers A1 to A6 essential to the invention and comparison products V1 to V3.

Part I was initially introduced into a 5 l high-grade steel pressure reactor with a stirrer, distillation equipment, reservoir containers for monomer mixture and initiator, including metering pumps, and automatic temperature regulation, and was heated up to the desired polymerization temperature (190° C. in the examples). Starting together and through separate feeds, part II (monomer mixture) was then metered in over a period of 3 hours and part III (initiator) over a period of 3.5 hours. The polymerization temperature was kept virtually constant (±2° C.). The mixture was then subsequently stirred at the polymerization temperature for 60 minutes. It was then cooled to room temperature and the solids content was determined. The graft copolymers had a solids content of 75±1%. At a solids content of ≦73%, the mixture was re-activated with 5% of the original amount of initiator at 150° C. for 30 minutes. At a solids content of between 73 and 74%, the mixture was initially distilled to 75±1%. Thereafter, the graft copolymer was filtered over a filter (Seitz Supra 5500). The compositions of parts I to III and the characteristic data of the resulting products are listed in table I.

Example 2

Rework of Copolymer 2 of EP-A 638 591 as Comparison example V4

Copolymer 2 was prepared as described in EP-A 638 591. A product with the following characteristic data was obtained:

| | |
|---|---|
| Solids content: | 74.2% |
| Viscosity at 23° C.; | 8,450 mPa.s |
| Acid number, solution/solid: | 7.5/10.1 |
| Hydroxyl number, solution/solid: | 109/147 |
| Hazen color number: | 65 APHA |
| Appearance: | clear |

Example 3

Reworking of Copolymer A3 of EP-A 778298 as Comparison example V5

Copolymer A3 was prepared as described in EP-A 778298. A product with the following characteristic data was obtained:

| | |
|---|---|
| Solids content: | 74.7% |
| Viscosity at 23° C.; | 6,180 mPa.s |
| Acid number, solution/solid: | 12.1/16.2 |
| Hydroxyl number, solution/solid: | 98/131 |
| Hazen color number: | 60 APHA |
| Appearance: | clear |

TABLE 1

Compositions and characteristic data of graft copolymers A1 to A6 essential to the invention and comparison products V1 to V3

|  | Copolymer | | | | | | | | |
|---|---|---|---|---|---|---|---|---|---|
|  | A1 | A2 | A3 | A4 | A5 | A6 | V1 | V2 | V3 |
| Composition | | | | | | | | | |
| Part 1 | | | | | | | | | |
| Butyl acetate | 21.00 | 21.00 | 21.00 | 21.00 | 21.00 | 21.00 | 21.00 | 21.00 | 21.00 |
| Part 2 | | | | | | | | | |
| Styrene | 22.80 | 22.80 | 22.80 | 22.80 | 15.20 | 15.20 | 22.80 | 22.80 | 22.80 |
| HEMA | 22.80 | 22.80 | 22.80 | 22.80 | 22.80 | 22.80 | 22.80 | 22.80 | 22.80 |
| Ethyl acrylate | 10.64 | — | — | — | 14.44 | 6.84 | 11.40 | — | — |
| Butyl acrylate | — | 10.64 | — | — | — | — | — | 11.40 | — |
| Butyl methacrylate | — | — | 10.64 | — | — | — | — | — | 11.40 |
| Methyl methacrylate | — | — | — | — | — | 7.60 | — | — | — |
| Isobornyl acrylate | 15.20 | 15.20 | 15.20 | 25.84 | 19.00 | 15.20 | 15.20 | 15.2 | 15.2 |
| Polybutadiene (Nisso B 1000[1]) | 0.76 | 0.76 | 0.76 | 0.76 | 0.76 | 0.76 | — | — | — |
| Acrylic acid | 0.76 | 0.76 | 0.76 | 0.76 | 0.76 | 0.76 | 0.76 | 0.76 | 0.76 |
| Part 3 | | | | | | | | | |
| Di-tert-butyl peroxide | 3.04 | 3.04 | 3.04 | 3.04 | 3.04 | 3.04 | 3.04 | 3.04 | 3.04 |
| Butyl acetate | 3.00 | 3.00 | 3.00 | 3.00 | 3.00 | 3.00 | 3.00 | 3.00 | 3.00 |
| Characteristic data | | | | | | | | | |
| Solids content, % | 75.3 | 75.2 | 75.2 | 75.1 | 75.6 | 75.2 | 75.6 | 75.6 | 75.8 |
| Viscosity at 23° C., mPa · s | 5,190 | 3,500 | 2,920 | 5,880 | 4,950 | 4,500 | 3,750 | 2,860 | 2,520 |
| Acid number, solution, mg KOH/g | 7.9 | 8.7 | 7.8 | 8.0 | 7.9 | 8.3 | 8.4 | 7.9 | 8.8 |
| OH number, solution, mg KOH/g | 95 | 96 | 96 | 96 | 95 | 96 | 95 | 95 | 97 |
| OH content, solid % | 3.85 | 3.9 | 3.9 | 3.9 | 3.8 | 3.9 | 3.8 | 3.8 | 3.9 |
| Color number, APHA | 15 | 10 | 10 | 5 | 30 | 40 | 10 | 10 | 15 |

[1] Commercial product of Nippon Soda

Use Example 4

This example describes the preparation of ready-to-use coating compositions based on polyacrylate polyols A1 to A6 and V1 to V5, application thereof and testing of the resulting coating films.

To evaluate the general coating properties, clear lacquers were prepared. For this, a lacquer polyisocyanate was added to polyols A1 to A6 and V1 to V5, an NCO/OH ratio of approx. 1:1. The lacquer polyisocyanate used was Desmodur N 3390, a polyisocyanate based on 1,6-diisocyanatohexane and containing isocyanurate groups, dissolved to 90% solids in butyl acetate/Solvent Naphtha 100 (1:1); NCO content of the solution: approx. 19.4 wt. %, content of free 1,6-diisocyanatohexane in the solution: less than 0.5%. The following amounts of additives were used, based on the solid resin (total of the solid contents of polyol and polyisocyanate)

| Constituents | wt. % solid to solid |
|---|---|
| Dabco 33 LV (PU catalyst from Air Products, 10% in butyl acetate) | 0.3 |
| BYK 331 (flow agent from BYK-Chemie, 50% in butyl acetate) | 0.3 |
| Tinuvin 1130 (UV absorber from Ciba Geigy, Basle, 50% in xylene) | 2.0 |
| Tinuvin 292 (light stabilizer from Ciba Geigy, Basle, 50% in xylene) | 1.0 |

A mixture of methoxypropyl acetate, xylene and n-butyl acetate (1:1:1) was used as the solvent. The mixture was adjusted to a content of:
approx. 56 wt. % binder,
approx. 2 wt. % additives, and
approx. 42 wt. % solvent The flow time (DIN 53 211, 4 mm nozzle) was between 20 and 26 s. The coating compositions were thus in a form almost completely ready for spraying and had a VOC value (volatile organic compounds) of 3.5 lb/gal, which corresponds to 420 g of solvent per 1 kg of lacquer.

It was only possible to obtain a flow time of 268 using the lacquer based on V4 and a flow time of 24 s using the lacquer of V 5, for a content of solvent of 42 wt. %. These flow times are actually too high for application and thus demonstrate that a VOC value of 3.5 lbs/gal and a flow time of 20 s cannot be obtained.

The coating compositions were drawn on to glass plates, dried both at room temperature and for 30 minutes at 60° C., during which the rate of drying (DIN 53 150) was determined, and then kept at room temperature for 7 days. The dry film thickness was approx. 40 to 50 µm.

The König hardness (DIN 53 157), the Gardner gloss at a 60° angle (DIN 67 530) and the ease of superficial dissolving by super-grade petrol (after storage at room temperature for 1, 2, 3 and 4 days) were then tested. The Erichsen indentation was determined on appropriately coated test metal sheets.

The resistance to yellowing under irradiation with short wavelength UV light was also tested in a QUV test (QUV accelerated weathering tester, ASTM G 53-77). For this, clear coating compositions based on polyols A1 to A6 and V1 to V5 were applied to aluminium sheets (68 mm×150 mm) which had been primed and coated with a white base coat beforehand. After application and drying of the lacquers (30 minutes at 60° C.), these sheets were kept at room temperature for 7 days and the n tested in the QUV apparatus (Q-Panel Company). In continuous cycles they were irradiated for 4 h in intensive, non-filtered UV light in the wavelength range from approx. 280 to 370 nm (maximum at 313 nm) and left to stand in the dark for 4 h, over a total duration of 1,000 h. After the specimen had been washed off, the total color difference ΔE (compared with the non-weathered sheet) was determined by means of a calorimeter as a measure of the yellowing which had occurred.

The test results of lacquers based on copolymers A1 to A6 and V1 to V5 are shown in table 2.

TABLE 2

Test results of 2C PU clear lacquers based on polyols A1 to A6 according to the invention and comparison polyols V1 to V5

| | Lacquer based on polyol | | | | | | | | | | |
|---|---|---|---|---|---|---|---|---|---|---|---|
| | A1 | A2 | A3 | A4 | A5 | A6 | V1 | V2 | V3 | V4 | V5 |
| Drying[1]) at RT | | | | | | | | | | | |
| T1 (minutes) | 60 | 70 | 65 | 50 | 55 | 60 | 85 | 95 | 90 | 120 | 80 |
| T3 (hours) | 6.0 | 6.5 | 6.0 | 5.5 | 5.5 | 6.0 | 7.0 | 7.5 | 7.0 | 8.0 | 6.5 |
| Pendulum damping | | | | | | | | | | | |
| 23° C. + 7 d RT(s) | 145 | 133 | 157 | 175 | 170 | 152 | 133 | 125 | 141 | 145 | 160 |
| 30'60° C. + 7 d RT(s) | 182 | 175 | 188 | 214 | 203 | 180 | 174 | 162 | 177 | 196 | 188 |
| Super-grade petrol resistance[2]) | | | | | | | | | | | |
| 23° C. + 1 d RT, 1 min/5 min | 0/0 | 0/1 | 0/1 | 0/0 | 0/0 | 0/0 | 1/2 | 1–2/3 | 1–2/3 | 2/4 | 0/1 |
| 23° C. + 2 d RT, 1 min/5 min | — | 0/0 | 0/0 | — | — | — | 0/1 | 0–1/1 | 0–1/1 | 1/3 | 0/0 |
| 23° C. + 3 d RT, 1 min/5 min | — | — | — | — | — | — | 0/0 | 0/0 | 0/0 | 0/1 | — |
| 23° C. + 4 d RT, 1 min/5 min | — | — | — | — | — | — | — | — | — | 0/1 | — |
| Erichsen indentation (mm) | 10.5 | 11.0 | 10.5 | 10.5 | 11.0 | 10.5 | 11.0 | 10.5 | 10.5 | 10.5 | 10.0 |
| QUV test (ΔE) 250 h/1,000 h | 3.0/5.5 | 3.1/5.7 | 2.9/5.8 | 3.0/5.5 | 3.1/5.8 | 3.1/5.7 | 3.0/5.1 | 3.1/5.6 | 3.0/5.7 | 3.7/6.1 | 3.2/5.8 |
| Gloss[3]) (∠60° C.) | 96/95 | 95/94 | 95/95 | 96/94 | 95/94 | 95/94 | 96/94 | 95/94 | 95/94 | 93/91 | 90/89 |

[1])T1 sand drying, T3 complete drying (DIN 53 150)
[2])0 = best value (no findings), 5 = worst value (coating completely dissolved at the exposed area)
[3])Before and after the QUV test (0 h/1,000 h)

DISCUSSION OF THE RESULTS

In spite of the high solids content on application, 2C PU clear coatings based on polyols A1 to A6 had a rapid drying at room temperature and were already resistant to the action of super-grade petrol after 1 to 2 days. The gloss, elasticity and film hardness were comparable with current standard systems, which had a substantially lower solids content on application. Compared with the coatings of polyols A1 to A6, the coatings of polyols V1 to V3 had a longer drying time and a poorer resistance to super-grade petrol after one day, which became better after 2 days and was in order only after 3 days. The coating based on polyol V4 had a slow drying and a poor resistance to super-grade petrol after one day, which became better after 2 and 3 days and was in order only after 4 days. The coating based on the comparison polyol V5 indeed had a good resistance to petrol, but drying was slower than with the coatings according to the invention. The test results thus clearly show that high-solids 2C PU clear coatings based on polyols A1 to A6 according to the invention show both a very rapid drying and a very good resistance to petrol, and that articles coated with them, preferably motor vehicles, can be put to their intended use after a very short time.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A binder composition comprising

A) 50 to 90 parts by wt. of an OH-functional graft copolymer resin prepared by the copolymerization of
  a) 0.1 to 10 parts by wt. of at least one polybutadiene or functional polybutadiene with a number-average molecular weight of 500 to 10,000 and a structure which is at least 20% 1,2-vinyl,
  b) 5 to 60 parts by wt. of at least one unsaturated aromatic monomer,
  c) 10 to 50 parts by wt. of at least one hydroxyalkyl ester of acrylic and/or methacrylic acid having 2 to 4 carbon atoms in the hydroxyalkyl radical and a primary hydroxyl group,
  d) 5 to 70 parts by wt. of at least one cycloaliphatic ester of acrylic and/or methacrylic acid having 3 to 12 carbon atoms in the cycloalkyl radical,
  e) 5 to 50 parts by wt. of at least one aliphatic ester of acrylic and/or methacrylic acid having 1 to 8 carbon atoms in the alcohol component,
  f) 0.1 to 5 parts by wt. of at least one α,β-monoolefinically unsaturated mono- or dicarboxylic acid having 3 to 7 carbon atoms and/or at least one maleic acid or fumaric acid half-ester having 1 to 14 carbon atoms in the alcohol radical and
  g) 0 to 40 parts by wt. of further copolymerizable olefinically unsaturated compounds (only up to 10 wt. % 2-hydroxypropyl methacrylate) and B) 10 to 50 parts by wt., of a polyfunctional crosslinking agent or crosslinking agent mixture, the sum of the parts by wt. of components A) and B), based on the weight of A) and B), and the sum of the parts by wt. of components a) to g) in each case being 100.

2. The binder composition of claim 1 wherein graft copolymers A) comprise:
   a) 0.2 to 8 parts by wt. of one or more polybutadiene or functional polybutadiene with a number-average molecular weight of 500 to 5,000 and a structure which is at least 30% 1,2-vinyl,
   b) 10 to 40 parts by wt. styrene,
   c) 15 to 45 parts by wt. hydroxyethyl acrylate, hydroxyethyl methacrylate, butane-1,4-diol monoacrylate or mixtures thereof,
   d) 10 to 50 parts by wt. of at least one cycloaliphatic ester of acrylic and/or methacrylic acid having 3 to 12 carbon atoms in the cycloalkyl radical,
   e) 10 to 40 parts by wt. of at least one aliphatic ester of acrylic and/or methacrylic acid having 1 to 8 carbon atoms in the alcohol component, f), 0.3 to 4 parts by wt. acrylic acid, methacrylic acid, maleic or fumaric acid half-esters having 1 to 8 carbon atoms in the alcohol component or mixtures thereof and
   g) 0 to 25 parts by wt. acrylonitrile, methacrylonitrile, hydroxypropyl (meth)acrylate (up to 10 wt. %), vinyl esters of aliphatic optionally branched monocarboxylic acids having 1 to 10 carbon atoms in the acid radical, di(cyclo)alkyl esters of maleic and/or fumaric acid having 1 to 8 carbon atoms in the alcohol radical or mixtures thereof.

3. The binder composition of claim 1 wherein graft copolymers A) comprise:
   a) 0.3 to 7.5 parts by wt. of one or more polybutadiene or functional polybutadiene with a number-average molecular weight of 500 to 3,000 and a structure which is at least 40% 1,2-vinyl,
   b) 15 to 35 parts by wt. styrene,
   c) 20 to 40 parts by wt. hydroxyethyl acrylate, hydroxyethyl methacrylate or mixtures thereof,
   d) 15 to 45 parts by wt. isobornyl acrylate, isobornyl methacrylate, cyclo-hexyl (meth)acrylate, 3,5,5-trimethylcyclohexyl (meth)acrylate, 4-tert-butylcyclohexyl (meth)acrylate or mixtures thereof,
   e) 10 to 40 parts by wt.,
   f) 0.5 to 3 parts by wt. acrylic acid, methacrylic acid or mixtures thereof and
   g) 0 to 20 parts by wt. hydroxypropyl (meth)acrylate (up to 10 wt. %), vinyl esters of aliphatic optionally branched monocarboxylic acids having 1 to 10 carbon atoms in the acid radical, di(cyclo)alkyl esters of maleic and/or fumaric acid having 1 to 8 carbon atoms in the alcohol radical or mixtures thereof.

4. The binder composition of claim 1 wherein graft copolymers A) comprise:
   a) 0.4 to 6 parts by wt. of one or more polybutadiene or functional polybutadiene with a number-average molecular weight of 500 to 2,000 and a structure which is at least 45% 1,2-vinyl,
   b) 15 to 25 parts by wt. styrene,
   c) 25 to 35 parts by wt. hydroxyethyl acrylate, hydroxyethyl methacrylate or mixtures thereof,
   d) 20 to 30 parts by wt. isobornyl acrylate,
   e) 15 to 25 parts by wt. of at least one aliphatic ester of acrylic and/or methacrylic acid having 1 to 4 carbon atoms in the alcohol component,
   f) 0.5 to 2 parts by wt. acrylic acid, methacrylic acid or mixtures thereof, and
   g) 0 to 10 parts by wt. hydroxypropyl (meth)acrylate (up to 5 wt. %), vinyl esters of aliphatic optionally branched monocarboxylic acids having 1 to 9 carbon atoms in the acid radical, di(cyclo)alkyl esters of maleic and/or fumaric acid having 1 to 6 carbon atoms in the alcohol radical or mixtures thereof.

5. The binder composition of claim 1 wherein polyfunctional crosslinking resin B) is an aminoplast resin.

6. The binder composition of claim 1 wherein polyfunctional crosslinking resin B) is an alkoxylated melamine resin, a melamine-formaldehyde condensation product, a urea resin, a guanidine resin or a mixture thereof.

7. The binder composition of claim 1 wherein polyfunctional crosslinking resin B) is a phenolic resin, a resol resin or a mixture thereof.

8. The binder composition of claim 1 wherein polyfunctional crosslinking resin B) is a polyisocyanate and/or polyisocyanate mixture.

9. The binder composition of claim 1 binder compositions wherein poly-functional crosslinking resin B) is a (cyclo)aliphatic polyisocyanate with free isocyanate groups and containing biuret, allophanate, uretdione, urethane, isocyanurate and/or iminooxadiazinedione groups and/or a mixture of such polyisocyanates.

10. The binder composition of claim 1 binder composition wherein poly-functional crosslinking resin B) is 4-isocyanatomethyl-1,8-octane-diiso-cyanate.

11. The binder composition of claim 1 wherein polyfunctional crosslinking resin B) comprises a mixture of 4-isocyanatomethyl-1,8-octane-diisocyanate and at least one (cyclo)aliphatic polyisocyanate with free isocyanate groups and containing biuret, allophanate, uretdione, urethane, isocyanurate and/or iminooxadiazinedione-groups.

12. The binder composition of claim 1 binder composition wherein poly-functional crosslinking resin B) is at least (cyclo)aliphatic polyisocyanate with blocked isocyanate groups.

13. A coated surface wherein the coating is prepared from a binder composition comprising
   A) 50 to 90 parts by wt. of an OH-functional graft copolymer resins prepared by copolymerization of
      a) 0.1 to 10 parts by wt. of at least one polybutadiene or functional polybutadiene with a number-average molecular weight of 500 to 10,000 and a structure which is at least 20% 1,2-vinyl,
      b) 5 to 60 parts by wt. of at least one unsaturated aromatic monomer,
      c) 10 to 50 parts by wt. of at least one hydroxyalkyl ester of acrylic and/or methacrylic acid having 2 to 4 carbon atoms in the hydroxyalkyl radical and a primary hydroxyl group,
      d) 5 to 70 parts by wt. of at least one cycloaliphatic ester of acrylic and/or methacrylic acid having 3 to 12 carbon atoms in the cycloalkyl radical,
      e) 5 to 50 parts by wt. of at least one aliphatic ester of acrylic and/or methacrylic acid having 1 to 8 carbon atoms in the alcohol component,
      f) 0.1 to 5 parts by wt. of at least one α,β-monoolefinically unsaturated mono- or dicarboxylic acid having 3 to 7 carbon atoms and/or at least one maleic acid or fumaric acid half-ester having 1 to 14 carbon atoms in the alcohol radical and
      g) 0 to 40 parts by wt. of further copolymerizable olefinically unsaturated compounds (only up to 10 wt. % hydroxypropyl methacrylate) and
   B) 10 to 50 parts by wt., of a polyfunctional crosslinking agent or crosslinking agent mixture,
the sum of the parts by wt. of components A) and B), based on the weight of A) and B), and the sum of the parts by wt. of components a) to g) in each case being 100.

14. The coated surface of claim 12 wherein the surface is selected from motor vehicles and motor vehicle components.

15. A process of repairing a car or coating a large vehicle or first the first coating of cars comprising the step of coating a binder composition of claim 1 onto a substrate.

16. A process of coating a surface binder compositions of general industrial items, wood and furniture comprising the step of coating a binder composition of claim 1 onto a substrate.

* * * * *